June 20, 1939. T. E. HILL ET AL 2,162,951
APPARATUS FOR CLEANING BOTTLES, JARS, OR THE LIKE CONTAINERS
Filed Sept. 28, 1936 6 Sheets-Sheet 2

Patented June 20, 1939

2,162,951

UNITED STATES PATENT OFFICE 2,162,951

APPARATUS FOR CLEANING BOTTLES, JARS, OR THE LIKE CONTAINERS

Thomas Edward Hill and Nealis Claremont Harrison, Kingston-upon-Hull, England

Application September 28, 1936, Serial No. 103,008
In Great Britain September 28, 1935

6 Claims. (Cl. 15—61)

The present invention relates to apparatus for cleaning bottles, jars, milk churns or the like containers of the type wherein brushes or the like are provided for cleaning both the inside and outside of the containers.

Several forms of apparatus for the purpose mentioned are already known, for example it has been suggested to arrange a pair of rotating brushes in substantially parallel relationship, each bottle to be cleaned being passed by hand to a position surrounding one of the said brushes whereupon on rotation of the brushes with the bottle between them the simultaneous cleaning of the inside and outside of the bottle is effected. Thereafter the bottles are removed from the brushes by hand. In an apparatus for automatically cleaning bottles or the like vessels in the manner referred to, it has also been suggested to elevate each bottle, whilst in an inverted position, by means of the brush for cleaning the inside of the bottles, so that the bottles are displaced towards the brush for cleaning the outside of the bottles. This method of cleaning, however, has not permitted of any cleansing solution or fluid being retained within the bottles to assist in the cleaning operation by the internal brush.

For convenience the brush adapted to clean the bottles internally is hereinafter referred to as the inner brush and that for cleaning the outer periphery of the bottle, the external brush.

The object of the present invention is to enable bottles, jars or the like containers to be automatically and simultaneously cleaned while permitting a quantity of cleansing solution or fluid to be retained by the bottle to assist in the cleaning by the inner brush and also permitting the external brush to be partially immersed in cleansing solution or fluid. Further objects of this invention are to permit of ready duplication of the inner and outer brushes and the total absence of any manual operation thereby reducing the handling of the bottles or like containers to a minimum.

According to the present invention, bottles, jars or the like containers, are conveyed by mechanical means, with their bases in the plane of or below the necks, to one or more positions coaxial with a corresponding number of inner brushes which are adapted for axial displacement to enter the bottles whereupon the bottles with the inner brushes are displaced horizontally or substantially so, to a position in which each engages with the periphery of an outer brush.

The bottles are preferably intermittently and laterally conveyed, either singly or in groups to the cleaning position and during the period of rest of the conveying mechanism, each bottle or each group of these simultaneously is engaged by a similar number of internal brushes and is axially displaced independently of the conveyor by said internal brushes to a position coincident with the external brush or brushes, to permit of both internal and external brushing operations to be carried out simultaneously, whereupon the bottles are rearwardly displaced back to the conveying mechanism to travel therewith away from the brushing location thereby permitting the next bottle or group of bottles to be similarly treated.

The invention is more particularly described with reference to the accompanying drawings, in which:—

In the construction according to the drawings, the shaft 20 driven from any suitable source of power supply drives a cam crank 21 and crank 22 through a self-contained speed reduction gear housed within a gear box 23 whilst an auxiliary gear 24 driven by the shaft 20 is provided to drive a shaft 25 which, in a manner not shown, serves for use in the automatic loading and discharge of bottles and the like containers to and from the conveyor.

The conveyor is made up of a pair of laterally spaced endless chains 26 supporting a series of transverse carriers 27 each of which consists of a plurality of spaced hollow carrier or pocket members 28 each adapted for the reception of a single bottle or the like container 29. The chains 26 constituting the endless conveyor are displaced intermittently in unison as will be hereinafter described, and travel over an adjustable sprocket 30 and an adjustable quadrant 31, in order to maintain the required degree of tension in the chains and similarity of registration of the conveyor and at successive intermittent movements relatively to the feeding and brushing positions. The bottles 29 individually are fed into the pockets or carrier members 28 at the extreme left hand end of the machine at the position indicated at 32 in the drawings, whereupon the bottles travel downwardly with the carriers to be submerged in water or other fluid contained in a preliminary soaking compartment 33, the rear wall of which is indicated at 34.

During their travel through the compartment 33 the bottles lie with their necks uppermost and are prevented from withdrawal from the pockets or carrier members 28 by guides 98. Each chain 26 of the conveyor then passes around a chain wheel 35 and a sprocket wheel 30 and with its carriers and bottles supported therein enters a second soaking compartment 36. In passing from the compartment 33 to the compartment 36, it will be appreciated that the bottles are emptied, this being due to the fact that when the chains of the endless conveyor pass around the chain wheel 35 the bottles in the pockets take up a position with their necks lowermost and thus permit water or other fluid within the bottles to be drained therefrom.

In passing from the intermediate compartment 36 the chains constituting the endless conveyor pass around wheels 37, 38, whereby the action on the bottles is similar to that in the compartment 33, and enter a compartment 39 which similarly contains fluid, preferably fresh water.

The drawings show two soaking compartments 33, 36, and a fresh water compartment 39, but it will be appreciated that any number of soaking or fresh water compartments may be provided other than those illustrated, or again the pockets when charged with bottles may enter the compartment 39 direct.

After immersion in the fresh water in the compartment 39 the transverse carriers 27 each comprising a plurality of carrier members or pockets 28 for housing a similar number of bottles 29 are successively brought into line with a group of brush spindles 40, whereupon the brushing operation as will hereinafter be described, is performed. Subsequent to the brushing operation the chains 26 of the conveyor continue their journey over the quadrants 31 and convey the pockets with the bottles into a fresh water rinsing compartment 41. The bottles 29 are then conveyed down a gradual incline with their necks lowermost to the left hand end of the plant, i. e., to the position 32 at which they are withdrawn from the carrier members 28 to enable fresh bottles to be inserted therein for a similar treatment. During this return movement to the feeding position, it will be appreciated that the bottles are allowed to drain.

The drive for the endless conveyor 26 is from a chain wheel 42 which is moved intermittently by a side-toothed claw clutch 43 which is composed of two interengaging toothed parts relatively displaceable for engagement and disengagement in a direction laterally of the machine. One of the parts has an extended arm 44 which is pivoted to one end of an adjustable connecting rod 45, the other end of which is pivoted to the crank 22 whilst the other part of the claw clutch disposed laterally thereof is mounted on a sliding key-way to be brought into and out of engagement with the first part so as to engage therewith on every third revolution of the crank 22. This interconnection of the two toothed parts of the claw clutch at predetermined intervals to effect intermittent rotation of the chain wheel 42 is effected through the cam crank 21, connecting rod 46, pivotal lever 47, push rod 48 connected at one end to said lever, cam guide or scroll 49, link 50 and bell crank 51 which latter pivots in a plane transversely of the machine.

The action is as follows:—

On rotation of the cam crank 21 the connecting rod 46 is reciprocated to cause angular displacement of the lever 47 about its pivotal shaft 52 on the supporting structure of the plant. This in turn causes reciprocation of the push rod 48 which through the cam guide 49 effects vertical displacement of the link 50 to cause angular displacement of the bell crank 51 about a pivot extending longitudinally of the apparatus, and thus bring one of the two halves of the claw clutch 43 into its engaging position with the other half whereby the chain wheel 42 is rotated as a unit from the crank 22, through the rod 45 and arm 44.

In the particular construction illustrated the driving crank 22 has three complete revolutions to each revolution of the cam crank 21, from which it will be seen that only one half revolution of the crank 22 out of each three complete revolutions is utilized to intermittently move the endless conveyor 26. In other words the conveyor 26 is displaced for a predetermined interval of time and then for a period five times as long it remains stationary so that a relatively large proportion of the time can be taken up in the brushing operation in comparison with that in which the conveyor is moved to bring bottles into and out of their brushing positions.

Further the arrangement is such that the slot or cam guide 49 only elevates the lever 50 when the brush spindles 40 and their associate mechanism are clear of the bottles in line therewith.

The inner brush spindles 40 each carrying a brush 53 are rotated from a train of gears within a gear box 54 which train is driven from a splined shaft 55 which is rotated through gears 56, 57, connected up to a counter-shaft 58, which in turn is driven by the main shaft 20 through an endless chain 59. The gear box 54 is secured to carriages 60, 60a which travel on track bars 61, 61a, respectively and are coupled to levers 47, 47a, the whole as a unit being reciprocated by means of the connecting rod 46 which is coupled to the crank pin of the cam crank 21. Thus the brushes 53 are rotated and also longitudinally displaced.

The brushes for cleaning the base of the bottles are shown at 62 and are mounted on clamps or supports 63 which are carried as a unit by reciprocating carriages 64, 64a at the sides of the machine, through the medium of transverse bars 65, 65a, said bars being bolted to brackets 66, 67, 68, 69, which in pairs are secured to bars 70, 70a, which are fixed to carriages 64, 64a and are located at opposite sides of the machine. The carriages 64, 64a are displaceable along track bars 61, 61a respectively and are coupled to levers 71, 71a, which are angularly reciprocated by the cam crank 21 and follower roller 72 and are coupled together by a pivotal shaft 99 on the structure of the plant.

A bottle guide 73 consisting of a bar extending transversely of the machine and having a number of spaced depending guide members 74 adapted to partially surround the individual bottles conveyed by the carrier members 28 is secured to slide bars 75, 75a, of spring boxes 76, 76a, respectively, said spring boxes being bolted to the transverse bars 65, 65a. These depending guide members 74 with their slides 75, 75a are displaceable relatively to their spring boxes 76, 76a, this displacement in one direction being against the action of a spring in each box 76, 76a.

The brushes for cleaning the outside of the bottles are shown at 77 and in the particular construction illustrated these are three in number so that each brush cleans the outside of two of the six bottles simultaneously treated by the series of inner brushes 53. These outside brushes 77 are driven from a gear box 78 through flexible hook and eye joints 79, the train gears within the gear box 78 being driven in turn from the shaft 20 through the shaft 58 and chain drive 59.

Figure 1:
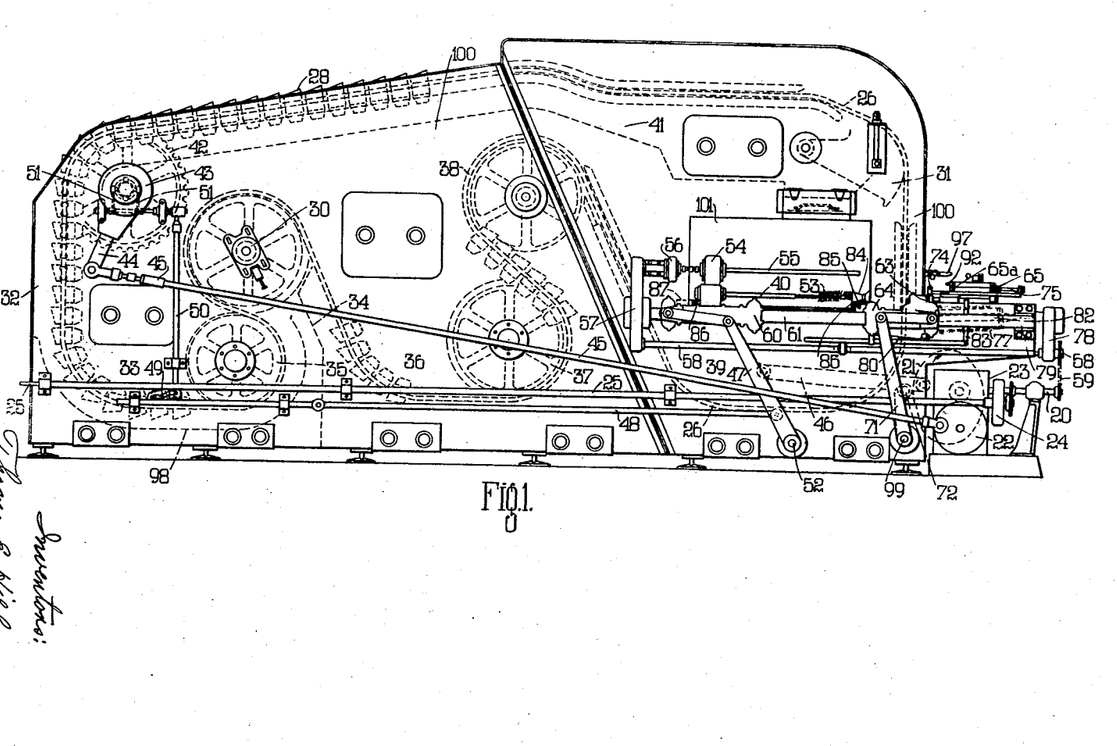
Figure 1 is a side elevational view of a cleaning or brushing apparatus fitted to one end of a plant in which bottles are soaked prior to cleaning.
Figure 2:
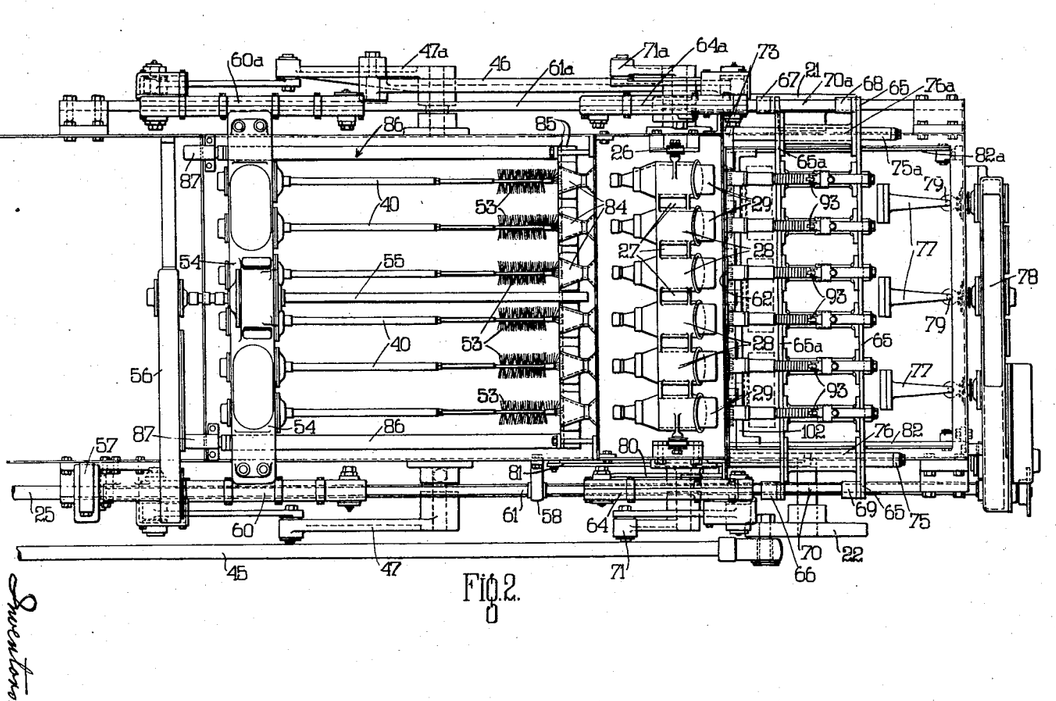
Figure 2 is a plan view of the cleaning or brushing part of the apparatus shown in Figure 1.

The raising and lowering of the outside brushes 77 to the contour of the bottles is effected by means of a cam strip 80 which is attached to the carriage 64, so that the cam strip reciprocates with the carriage and bears on a following roller attached to a lever 81 the left hand end of which is pivoted, as shown in Figure 2, to the side wall of the plant. The lever 81 is coupled to bearing guides 82, 82a for the brushes by means of a connecting link 83. The bearing guides 82, 82a carry a transverse bearer 102 for the outside brush ends 77. The cam strip 80 is shaped in accordance with the shape of the bottle or the like container to be brushed and is inter-changeable as desired. It follows, therefore, that upon movement of the carriages 64, 64a to the right, the cam strip 80 operates through the following roller to raise the lever 81 about its pivot on the side wall of the plant and this, in turn, raises the link 83 and the transverse bearer 102 for the outside brushes 77.

Centering cups 84 are mounted as a unit on a transverse guide bar 85 which is coupled at its ends to slide bars 86, the opposite ends of which are flanged and secured to spindles slidably mounted in spring boxes 87 which are located at opposite sides of the machine and which operate in a manner similar to the spring boxes 76, 76a. In this respect it will be appreciated that the function of several spring boxes 76, 76a, 87 is to provide a means of resilience where motion of the various mechanisms is arrested by the bottles, each of the spring boxes housing a spring of a predetermined strength. The flanges of the bars 86 lie in the path of displacement of the ends of the gear box 54 so that when the centering cups 84 are in the position shown in Figure 5, the flanges at the left hand end of the bars 86 (Figure 2) have been displaced to the left by the gear box 54 for the brushes whereby the spring in each box 87 is compressed. On movement of the brushes (Figure 2) towards the bottles, the gear box 54 no longer holds the flanges on the bars 86 in those positions which are consistent with the springs under compression and as a result the springs force the bars 86 towards the right (Figure 2) and thus move the centering cups 84 to the position shown in Figure 6. As will be seen from Figure 2 and Figures 5 to 10 the centering cups 84 are of double conical form, said cups being hollow throughout to permit of the passage of the brushes 53 through them, the left hand end of the cups forming the guide for the brushes 53 and the right hand conical end of the cups forming the guide for the necks of the bottles when brushing is about to be performed.

Each of the base brush clamps or supports 63 is separately mounted on a spindle 88 (see Figure 3) and is displaced in unison with a slide bar 89 until it overcomes a load created by a strong spring 90 in which event it is displaceable relatively to the bar 89. Each slide bar 89 in turn is displaceable relatively to the transverse bars 65, 65a, against a relatively light spring 91 which is located within a spring box housing 103 each of which is secured at its ends to the transverse bars 65, 65a on the carriages 64, 64a. Each slide bar 89 is rigid with a rack bar 92 whilst a pawl 93 resiliently loaded at 94 is carried by a yoke 95 rigid with the housing 103 and the bars 65, 65a. Each slide bar 89 carries a spindle 96 so that a relatively light resilient load created by each spring 91 is available to resist movement of the slide bar 89 and the base brush clamp or support 63 relatively to the bars 65, 65a until the brushes 62 of the clamps 63 engage with the bottle bases, whereupon the load created by the springs 91 is overcome.

A number of spring compensated cams 97, one for each base brush clamp or support, is mounted on the casing of the apparatus in the path of the pawls 93 so that when the base brush clamp assembly moves towards the cams 97 the pawls are depressed to engage with the teeth of the racks 92.

One side wall of the casing of the plant is shown at 100, said wall having an inspection opening 101.

Figures 5, 6:
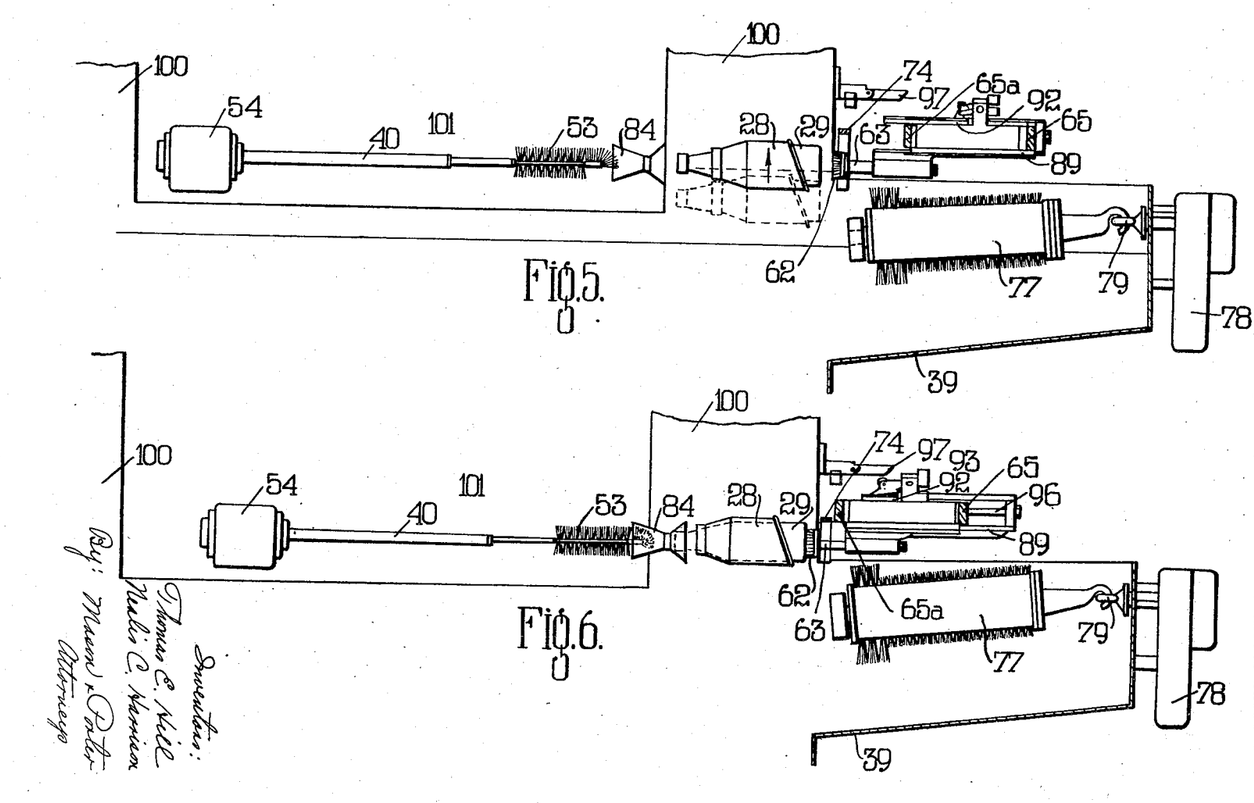
Figures 5–10 are views showing the relative position of the brushes, the bottles and the carrier member at successive periods in the cleaning process.

In operation, the carrier members 28 housing bottles 29 filled with water or other fluid rise to a position co-axial with the inner brush spindles 40 during the drive of the endless conveyor and at the time the conveyor is about to be stopped between successive periods of intermittent movement the various parts of the bottle cleaning or brushing apparatus are in the position shown in Figure 5, that is to say, each double centering cup 84, each inside rotating brush 53, its co-operating brush clamp 63, the outside brushes 77 and the bottle guides 74 are all in the clearance positions relatively to the conveyor. In other words the crank 22 is just completing its stroke and the claw clutch halves are about to separate. After the drive from the crank 22 has been isolated from the wheel 42 due to separation of the claw clutch halves, the cam crank 21 continues its rotation to displace the various elements associated therewith. In consequence, immediately the drive for the conveyor has ceased, the various elements move to the position shown in Figure 6, that is to say the double centering cups 84 under the action of the springs in the spring boxes 87, move in the direction towards the necks of the bottles 29, thus bringing all the bottle necks irrespective of the length of the bottles, in one straight line transversely across the machine.

Figures 3, 4:
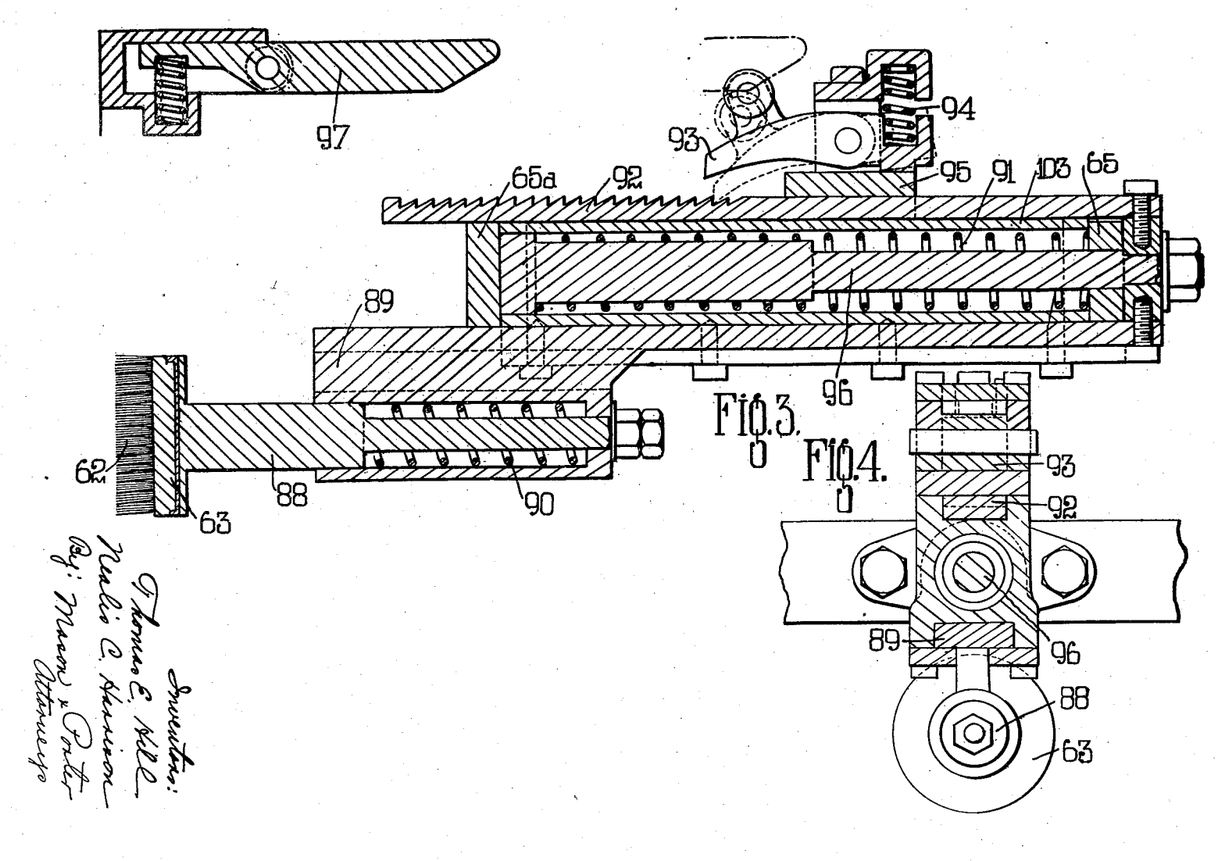
Figure 3 is a detail of the clamping means for controlling the base brush during the process of cleaning.
Figure 4 is a vertical sectional view of Figure 3.

Simultaneously, the spring loaded base brush clamps 63 and the carriages 64, 64a move in a direction towards the base of the bottles and push the bottles through the carriers 28 to press the necks of the bottles into the cups 84. In this movement the carriages 64, 64a, the transverse bars 65, 65a, the spring box housings 103, the slide bars 89 and the base brushes 62 together with their clamps or supports 63, all move together in unison. In order to compensate for bottles of varying length, and after the necks of the bottles have been engaged with the centering cups the base clamps 63 come to rest but the housings 103 and the transverse bars 65, 65a, with the pawls 93 continue their movement against the action of the springs 91, and when this movement of the spring box housings 103 is almost complete the spring compensated cam strips 97 on the wall of the apparatus come into contact with the ratchet pawls 93 and trip these into contact with the racks 92 to hold the clamps or supports 63 positively against the bases of the bottles, whereupon the inside brushes 53 then pass through the bottle necks into the body of the bottles. It will thus be seen that the separate brush support 63 move to a greater or less extent according to the length of the bottles to be engaged by said supports 63. In the case of relatively long bottles the pawl 93 engages near the left hand end of its corresponding rack 92 whilst in the case of relatively small bottles it engages with a tooth adjacent the right hand end of the rack as seen in Figure 3. The springs 90 provide a degree of resiliency after the pawls 93 have engaged with their corresponding racks 92 and thus prevent possible breakage of the bottles. The various elements in this position are shown in Figure 7.

Figures 7, 8:
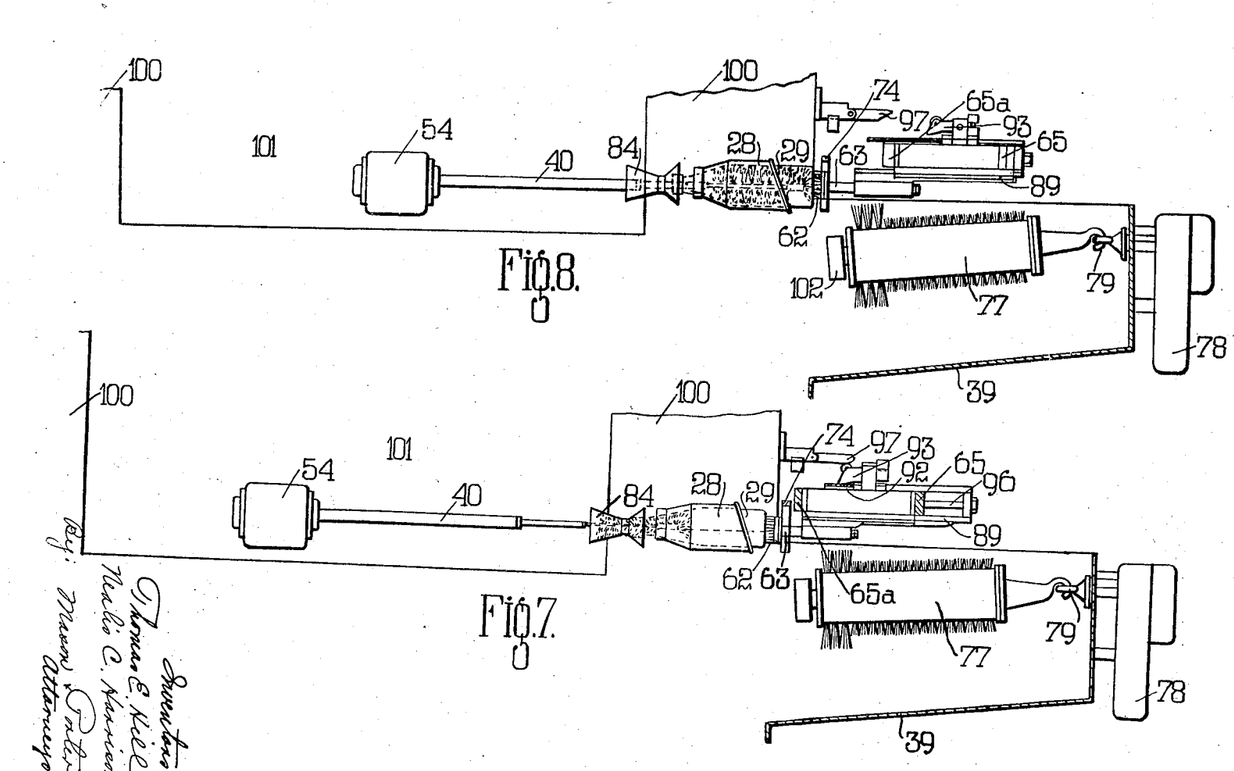

In proceeding with the cycle of operations the inside brushes 53 move towards the base of the bottles to the position shown in Figure 8, whilst the base brush clamps 63 according to the size of the bottles with which they are dealing, move in the outward direction until the inner brushes 53 and the outer brushes 62 contact with the inner and outer faces of the base of the bottles, in which position the bases of the bottles are in line transversely. During this movement, both the inner and outer faces of the base of each bottle receive a thorough brushing operation.

Figure 9:
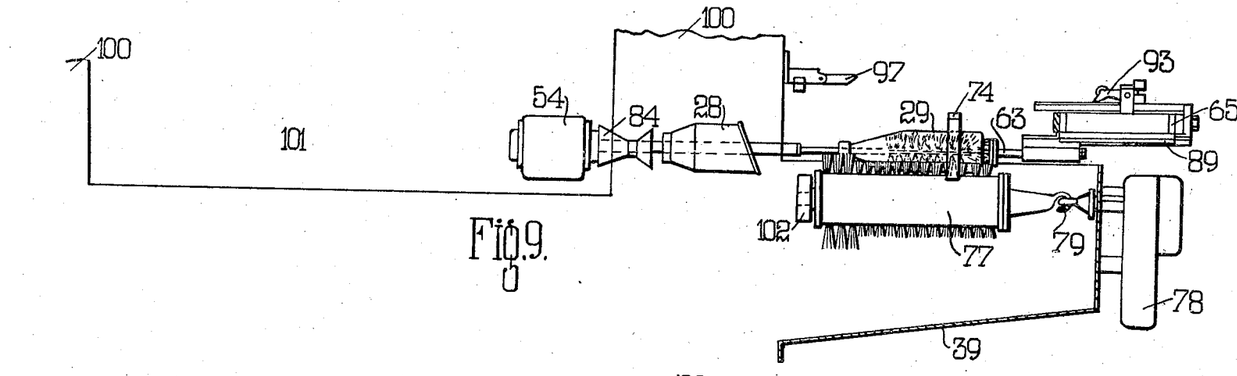

From this point both the inner brushes and the base brushes move in unison with each other to the position shown in Figure 9 and during this movement the bottles are displaced by the inner brushes 53 out of engagement with the pockets 28 whilst the bottle guides 74 are displaced longitudinally relatively to the bottles, so that they hold the bottles against lateral and vertical movement thereof likely to be caused by the rotation of the outside brushes 77 which are raised to engage with the outer surfaces of the bottles. Thus the inner brushes 53 and the guides 74 during this step in the process, constitute the support for the bottles. As the lower part of each rotating outer brush 77 is submerged in water or other fluid, the water is caused to cling to the peripheries of the outer brushes and has a swilling effect on the outside of the bottle.

Figure 10:
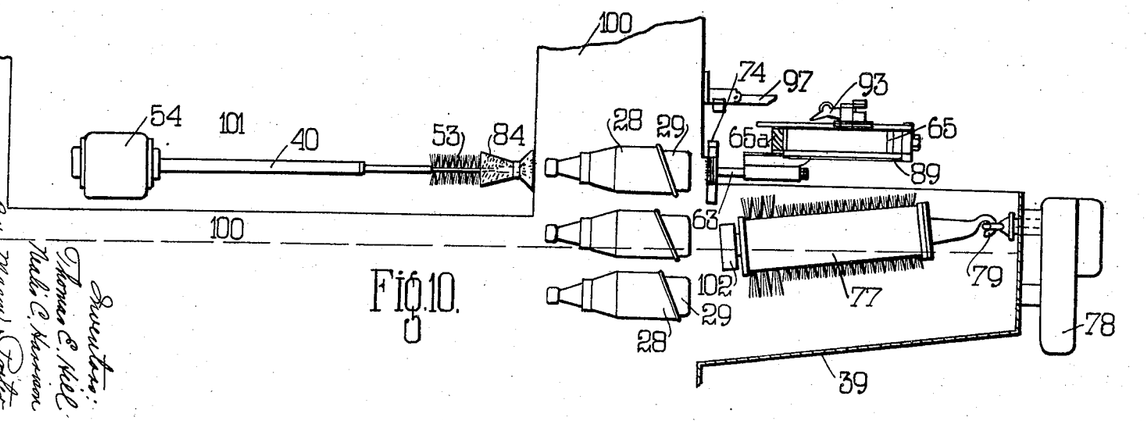

After arriving at the extreme ends of their strokes both series of inner brushes 53 and base brushes 62 return in unison until the base brushes arrive at the position shown in Figure 10 where they remain in position ready for cleaning the next group of bottles. The conveyor is now displaced by interengagement of the claw clutch halves and commences to bring the next group of bottles into a position co-linear with the inner brush spindles which during this movement of the conveyor continue their retreating movement to the position shown in Figure 5. From this point the cleaning action as a whole on the next group of bottles is repeated as described.

It will be appreciated that the feed of the bottles to a position where they are engaged by the cups 84 and the inner brushes 53 is laterally of the direction of movement of said brushes when displacing the bottles into and out of contact with the outside brushes 77. Although this lateral feed, in the construction illustrated is vertical, it may of course take place horizontally.

The external cleaning brushes 77 may be of any desired shape to substantially conform with the profile of one side of a bottle, that is to say the bristles at one end are longer than at the other, and are preferably driven continuously in a direction opposite to that of the inner brushes as one method of obtaining a difference in surface speed of the inner and outer brushes. If desired however external brushing may be effected by brushes fitted to an endless chain belt, such as a slat conveyor, the belt being driven from the same source as the remaining movable parts of the apparatus and moving transversely of the direction of travel of the bottles about the inner brushes.

We declare that what we claim is:

1. Apparatus for cleaning containers such as jars and milk churns comprising a rotatable brush, means for delivering a container to a position co-axial with said rotatable brush, a base brush, means for positioning said base brush against the base of said container, external brushing means, means for rotating said external brushing means, and means for displacing said rotatable brush longitudinally in a substantially horizontal direction into said container for conveying said container while contacted by said base brush to said external brushing means.

2. Apparatus for cleaning containers such as bottles, jars and milk churns comprising internal brush means, a conveyor for bringing at least one container at a time into a horizontal position co-axial with said internal brush means, external brush means, carriage means for displacing said internal brush means longitudinally in a substantially horizontal direction into each container for conveying said container to said external brush means, a base brush displaceable into engagement with the base of each container prior to displacement of said container by said internal brush means, a drive common to said conveyor and said brush means and said carriage, means in said drive for displacing said carriage and means in said drive for rotating said internal and said external brush means in opposite directions.

3. Apparatus for cleaning containers such as bottles, jars and milk churns comprising a tank containing cleansing liquid, an endless conveyor for laterally conveying containers in succession to a position in said tank above said liquid level with the containers horizontal, means for intermittently driving said conveyor, base brushes adapted to engage with the bases of said containers when said conveyor is at rest, internal brushes operated by the drive of said conveyor for axially displacing said containers substantially horizontally and in a direction longitudinally of said containers, external brush means to which containers are displaced by said internal brush means and means operated by the drive for the conveyor rotating said internal and external brush means.

4. Apparatus for cleaning containers such as bottles, jars and milk churns comprising a plurality of internal brushes in spaced parallel relationship, an endless conveyor for conveying containers laterally of said internal brushes, means for driving said conveyor intermittently, hollow cup means, one for each internal brush and co-axial therewith, a base brush for each container adapted to engage the neck of each container with its cup when said conveyor is at rest, external brushes and means to displace said internal brushes through said cups into said containers and for displacing said internal brushes, said containers and said base brushes in unison to said external brush means.

5. Apparatus for cleaning containers such as bottles, jars and milk churns comprising a plurality of internal brushes in spaced parallel relationship, an endless conveyor for conveying containers laterally of said internal brushes, means for driving said conveyor intermittently, hollow cup means, one for each internal brush and co-axial therewith, a base brush for each container adapted to engage the neck of each container with its cup when said conveyor is at rest, external brushes, means to displace said internal brushes through said cups into said containers and for displacing said internal brushes, said container and said base brushes in unison to said external brush means and means for relatively rotating the surfaces of said internal and said external brush means.

6. Apparatus as claimed in claim 3 and including spring boxes for controlling displacement of said base brushes, additional spring boxes, and double centering cups under the action of springs in said additional boxes, which cups are caused to engage with the necks of said containers to align said necks transversely irrespective of the varying lengths of containers to be cleaned simultaneously by said brushes.

THOMAS EDWARD HILL.
NEALIS CLAREMONT HARRISON.